United States Patent
Nakagawa et al.

(10) Patent No.: US 8,411,988 B2
(45) Date of Patent: Apr. 2, 2013

(54) IMAGE PROCESSING APPARATUS AND METHOD FOR MANAGING MARGIN DATA

(75) Inventors: Akio Nakagawa, Yokohama (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1244 days.

(21) Appl. No.: 12/179,043

(22) Filed: Jul. 24, 2008

(65) Prior Publication Data

US 2009/0034861 A1 Feb. 5, 2009

(30) Foreign Application Priority Data

Aug. 3, 2007 (JP) ................................. 2007-203102

(51) Int. Cl.
*G06K 9/40* (2006.01)

(52) U.S. Cl. ........ 382/274; 382/254; 382/260; 382/275; 382/282; 358/505; 358/408; 358/448; 358/461; 358/474

(58) Field of Classification Search .................... None
See application file for complete search history.

(56) References Cited

U.S. PATENT DOCUMENTS

| | | | | |
|---|---|---|---|---|
| 5,163,100 A * | 11/1992 | Mathieu et al. | ............... | 382/304 |
| 6,553,151 B1 * | 4/2003 | Gahang | ........................ | 382/274 |
| 6,891,648 B2 * | 5/2005 | Inoue et al. | .................... | 358/516 |
| 6,950,559 B2 | 9/2005 | Kobayashi | .................... | 382/260 |
| 7,076,161 B2 | 7/2006 | Koike | | |
| 7,630,103 B2 * | 12/2009 | Sakakibara | .................... | 358/482 |
| 2006/0045333 A1 * | 3/2006 | Wu et al. | ........................ | 382/167 |
| 2008/0037882 A1 * | 2/2008 | Tamura et al. | ................. | 382/232 |

FOREIGN PATENT DOCUMENTS

| | | |
|---|---|---|
| JP | 07-074925 A | 3/1995 |
| JP | 11-317864 A | 11/1999 |
| JP | 2000-137587 A | 5/2000 |
| JP | 2002-307643 A | 10/2002 |
| JP | 2004-078067 A | 3/2004 |
| JP | 2004-128811 A | 4/2004 |
| JP | 2006-301986 A | 11/2006 |

OTHER PUBLICATIONS

Office Action issued on Oct. 4, 2011, in counterpart Japanese Patent Application 2007-203102.
Office Action which issued on Dec. 20, 2011, in counterpart Japanese application No. 2007-203102.

* cited by examiner

*Primary Examiner* — Matthew Bella
*Assistant Examiner* — Jason Heidemann
(74) *Attorney, Agent, or Firm* — Fitzpatrick, Cella, Harper & Scinto

(57) ABSTRACT

An image processing apparatus partitions entered image data into first partitioned image data and appends margin data to the first partitioned image data. The image processing apparatus corrects the first partitioned image data other than the margin data to second partitioned image data and processes the second partitioned image data and the margin data.

16 Claims, 6 Drawing Sheets

IMAGE PROCESSING APPARATUS AND METHOD FOR MANAGING MARGIN DATA

BACKGROUND OF THE INVENTION

1. Field of the Invention

The present invention relates to an apparatus and method for processing partitioned image data obtained by partitioning image data.

2. Description of the Related Art

A control apparatus for performing copying by controlling a scanner and printer is equipped with an image processing apparatus for converting image data read by the scanner into image data suitable for printing. Generally, a buffer for holding several lines of image data to be processed is provided as a structural element of the image processing apparatus. However, since an increase in image size is accompanied by an increase in line size as well, the above-mentioned method requires that the image processing apparatus be made over whenever the size of an image to be processed increases.

In order to deal with this, U.S. Pat. No. 6,950,559 discloses a method of partitioning image data, which is to undergo processing, into prescribed units (referred to as "band units" below) in the sub-scan direction, performing a scan conversion in units in which the data has been partitioned and then transmitting the resultant data to a subordinate image processing unit, which is a subsequent stage. This method is referred to as a cross-band method. By using the cross-band method, it is possible to execute processing of image data of any size using a buffer of limited size without dependence upon line size.

A problem which arises when an image is read is that owing to a variation in the characteristics of the reading sensor, the brightness level of the read data differs depending upon the sensor. To deal with this problem, a method known in the art is to accommodate for individual differences between sensors by applying an output-level correction conforming to each individual sensor and so arrange it that an image quality having a uniform brightness level is obtained. Image processing for carrying out such a level correction is referred to as a "shading correction".

Filter processing, which is one form of image processing, makes reference to pixel values neighboring a pixel to be processed and performs a specific computation based upon these values to thereby calculate a processing result. Since neighboring pixels do not exist at the edge portions of image data, filter processing cannot be applied as is to these edge portions. However, a method that makes filter processing possible by appending dummy data to the periphery of the image-data edge is known. The dummy data appended for this purpose is referred to as "margin data" below. With the cross-band method, filter processing is implemented by appending the necessary margin data in band units. In general, the order in which the shading correction and filter processing are executed is such that the shading correction precedes the filter processing.

If it is attempted to apply the correction before the scan conversion when correction processing such as the shading correction is performed with the cross-band method, a line buffer conforming to the line size of the image is required and, hence, the advantage of the cross-band method is halved. Accordingly, it is desirable that the shading correction be applied to band data that prevails after the scan conversion. However, since margin data has been appended to the band data, the values of the margin data change from what is intended when the shading correction is applied to the margin data, and this has a deleterious effect upon the subsequent filter processing, etc.

Further, in the conventional method of setting margin data, the values of the margin data are fixed at white and margin size lacks flexibility as well. There is usually no problem when the values of the margin data are white. However, if the values of the margin data are white when an original such as film is read, there is the possibility that the image quality of the result of image processing that refers to the margin data will not be what is desired. Further, although a large margin size can be set in the main-scan direction, almost no margin can be appended in the sub-scan direction.

SUMMARY OF THE INVENTION

An object of the present invention is to process corrected image data appropriately.

Another object of the present invention is to make it possible to execute image processing with small-capacity memory.

Another object of the present invention is to provide an image processing apparatus comprising: partitioning unit adapted to partition entered image data into first partitioned image data; appending unit adapted to append margin data to the first partitioned image data; correcting unit adapted to correct the first partitioned image data other than the margin data to second partitioned image data; and processing unit adapted to process the second image data and the margin data.

A further object of the present invention is to provide an image processing method comprising the steps of: partitioning entered image data into first partitioned image data; appending margin data to the first partitioned image data; correcting the first partitioned image data other than the margin data to second partitioned image data; and processing the second image data and the margin data.

Further features of the present invention will become apparent from the following description of exemplary embodiments with reference to the attached drawings.

DESCRIPTION OF THE EMBODIMENT

A preferred embodiment of the present invention will now be described in detail with reference to the accompanying drawings.

Figure 1:
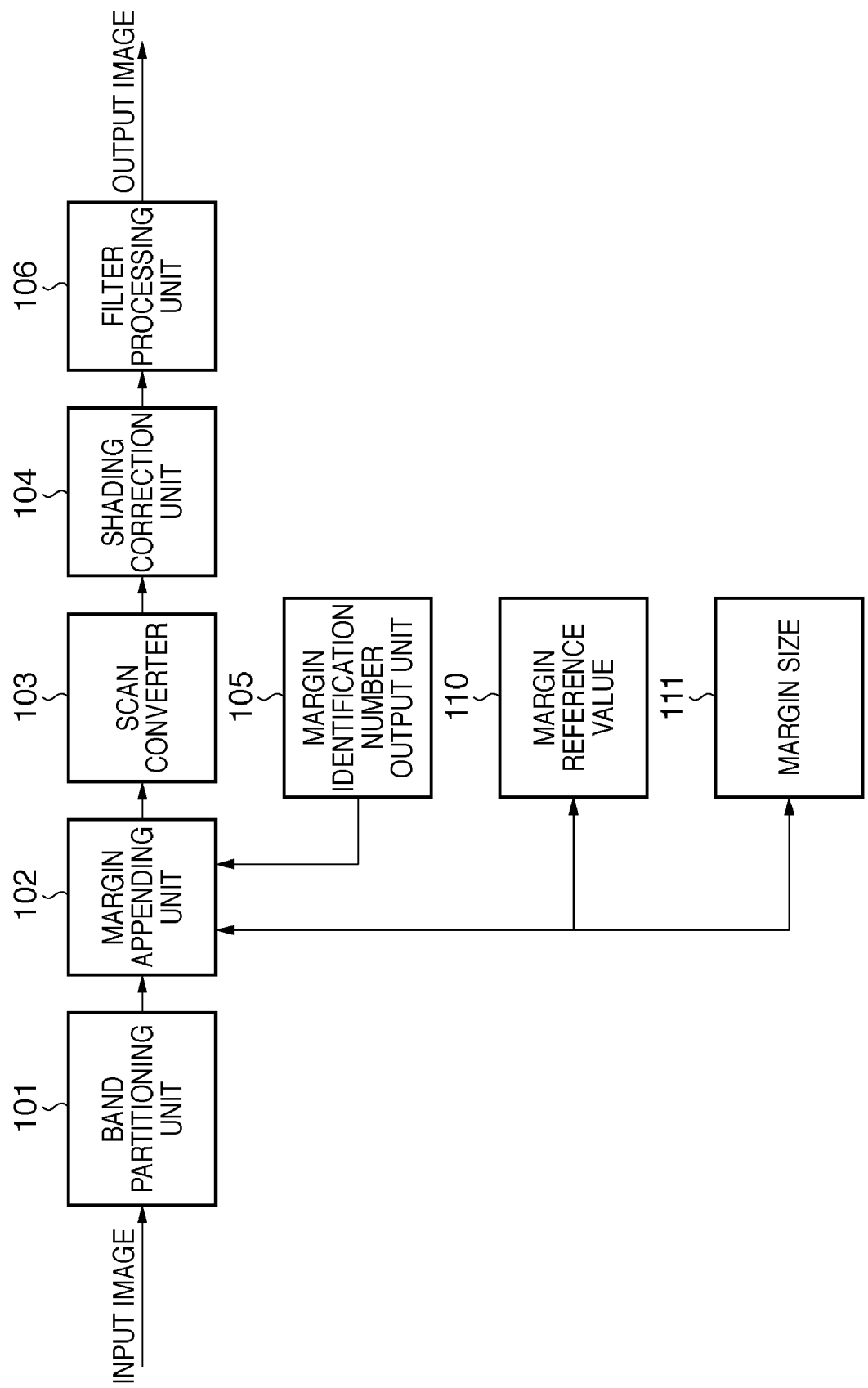
FIG. 1 is a block diagram illustrating the configuration of a scanner image processing apparatus according to an embodiment of the present invention.
Figure 8:
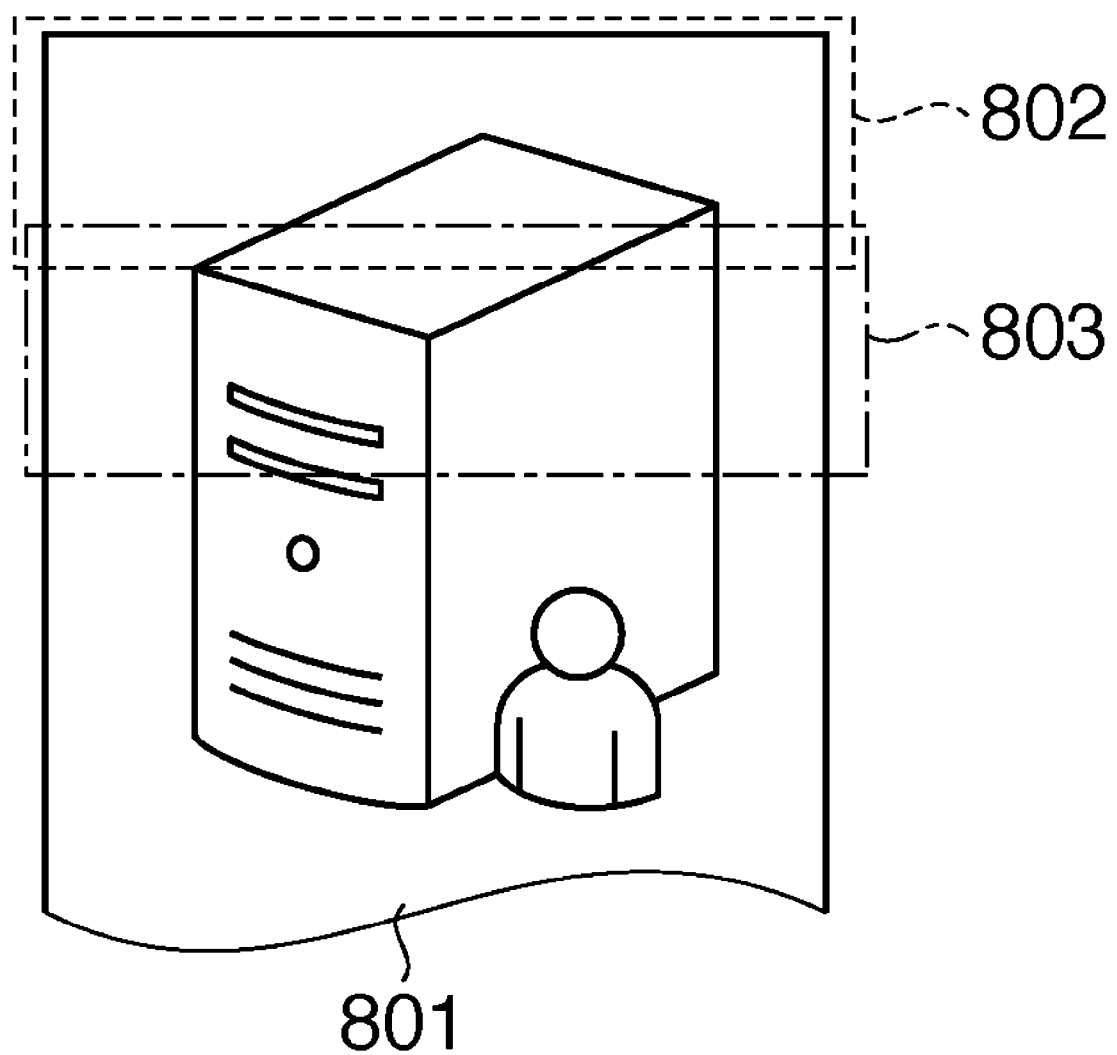
FIG. 8 is a diagram useful in describing partitioning of image data into band data.

FIG. 1 is a block diagram illustrating the configuration of a scanner image processing apparatus according to an embodiment of the present invention. As shown in FIG. 1, input image data is partitioned into a prescribed band size by a band partitioning unit 101. As illustrated in FIG. 8, band processing involves partitioning image data 801 in prescribed units in the sub-scan direction, as in the manner of band data 802, 803.

Next, margin data is appended to the partitioned band data (partitioned image data) by a margin appending unit 102. The margin data to be appended is set in accordance with a margin reference value 110 and margin size 111. With regard to the margin reference value 110, a value corresponding to white is set as the margin data in the case of an ordinary original. However, in the case of a film original, for example, it is possible to change the value of the margin data to a value corresponding to black, and in other cases also it is possible to set an optimum value conforming to the original. Further, the size of margin data used in a filter processing unit 106 of a latter stage is set as the margin size 111. For example, it is necessary to set one pixel as the size of the margin data in case of filter processing of 3×3 pixels and two pixels in case of filter processing of 5×5 pixels.

A margin identification number output unit 105 enables a margin identification signal (margin identification information), which identifies margin data, and appends the information to the margin data that has been appended by the margin appending unit 102. On the other hand, the margin identification number output unit 105 appends a disabled margin identification signal to band data that is not margin data.

Next, the output from the margin appending unit 102 is subjected to a scan conversion in the sub-scan direction by a scan converter 103, and the scanning data is transmitted to the next stage (a shading correction unit 104).

A "scan conversion" refers to a conversion in which a band image is scanned in the sub-scan direction, the image is shifted one column in the main-scan direction and scanning in the sub-scan direction is repeated.

The scanning data scanned by the scan converter 103 is input to the shading correction unit 104. When margin data is scanned, the shading correction unit 104 detects the margin identification signal. The shading correction unit 104 applies an image correction (shading correction) solely to band data for which the margin identification signal has been disabled and transmits the result to the filter processing unit 106, which is the next stage.

Figure 7:
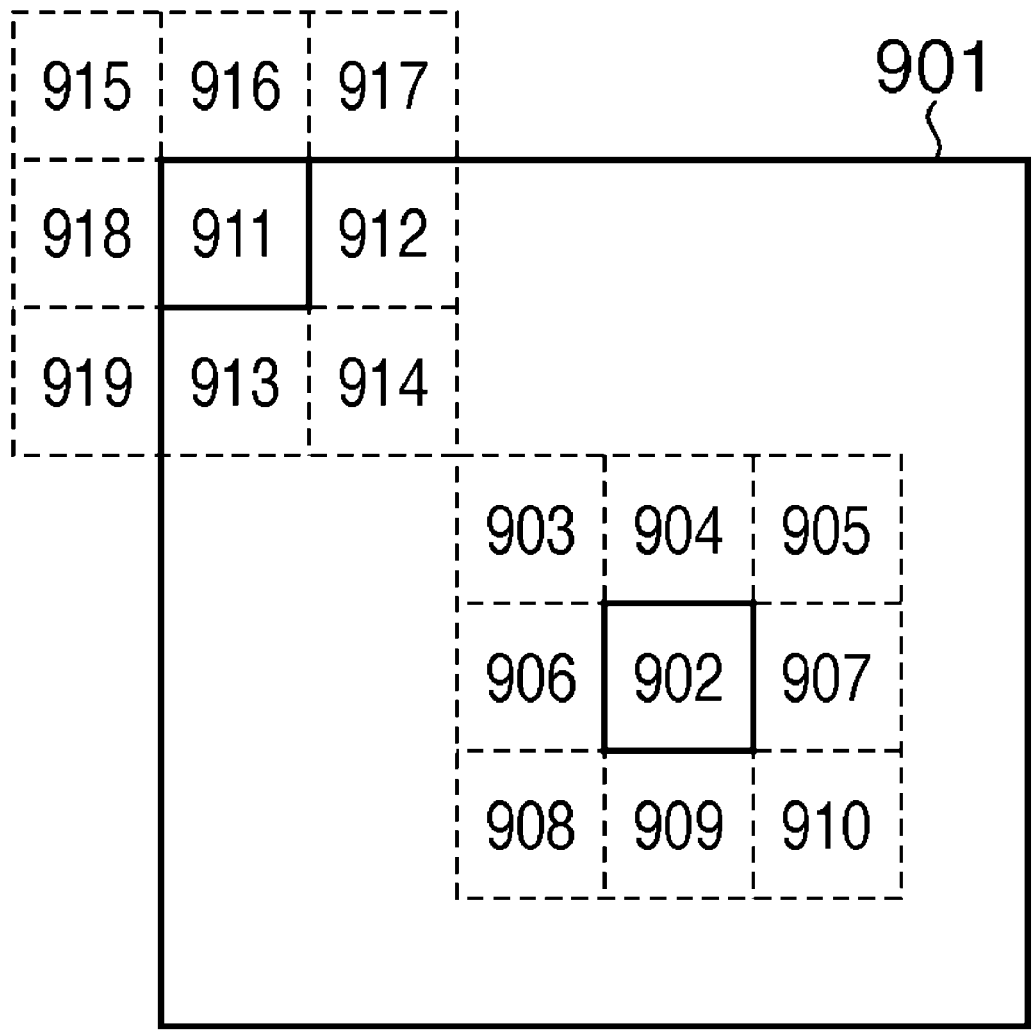
FIG. 7 is a diagram useful in describing filter processing of 3×3 pixels.

An example of a case where 3×3 neighboring pixels are required for processing in the filter processing unit 106 will be illustrated below. In order to apply filter processing to a pixel 902 in image data 901 in FIG. 7, it is necessary to refer to the pixel 902 and to information of eight neighboring pixels 903, 904, 905, 906, 907, 908, 909 and 910. Furthermore, in the case of a pixel at an edge, such as pixel 911, only pixels 912, 913 and 914 exist as neighboring image data. Accordingly, processing is executed by referring to margin pixels 915, 916, 917, 918, 919, which have been appended, by regarding them as the remaining neighboring image data. The filter processing unit 106 thus applies filter processing to each pixel. The scanner image processing block is ended by the foregoing operation and the data that is the result of image processing is transmitted to an image processing block for printing, etc., of subsequent stages.

Figure 2:
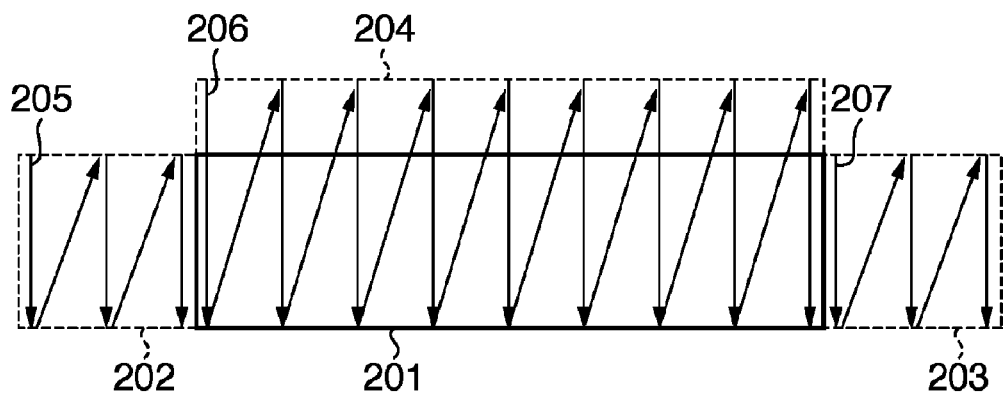
FIG. 2 is a diagram illustrating upper-edge band data and margin data that has been appended thereto.
Figure 3:
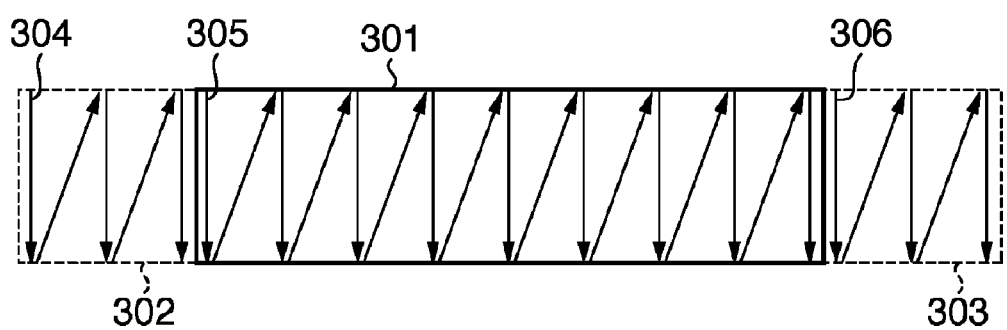
FIG. 3 is a diagram illustrating intermediate band data and margin data that has been appended thereto.
Figure 4:
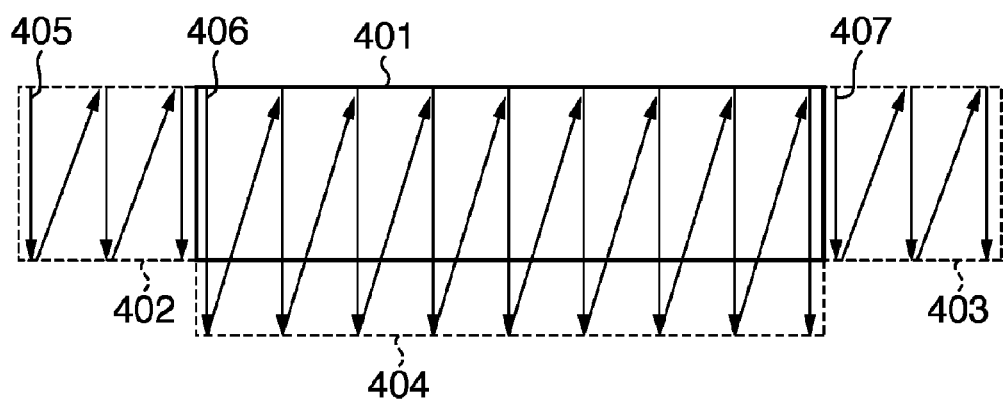
FIG. 4 is a diagram illustrating lower-edge band data and margin data that has been appended thereto.

Next, reference will be had FIGS. 2 to 4 to describe examples of scanning with respect to partitioned band data (partitioned image data) and margin data.

FIG. 2 illustrates band data 201 situated at an upper edge of an image (this data is referred to as "upper-edge band data" below), such as band data 802 in FIG. 8, as well as margin data that has been appended by the margin appending unit 102. Specifically, margin data 202, 203 and 204 has been appended to the left, right and upper portions, respectively, of the upper-edge band data 201.

When scanning in the sub-scan direction is carried out, scanning is performed, as indicated by arrow 205, from the upper left of the margin data 202 to the lower end thereof, scanning then transitions to the upper end of one column to the right and is then performed to the lower end of this column. Such scanning is repeated until the lower right of the margin data 202 is reached (this is the scan conversion mentioned above). Next, a transition is made to the upper left of the margin data 204, scanning is performed, as indicated by arrow 206, to the lower end of the upper-edge band data 201, scanning then transitions to the upper end of one column to the right and is then performed to the lower end of this column. Such scanning is repeated until the lower right of the upper-edge band data 201 is reached. Finally, a transition is made to the upper left of the margin data 203, scanning is performed, as indicated by arrow 207, to the lower end of the margin data 203, scanning then transitions to the upper end of one column to the right and is then performed to the lower end of this column. Such scanning is repeated until the lower right of the margin data 203 is reached. This ends the scanning of the entirety of FIG. 2.

FIG. 3 illustrates band data 301 other than that situated at the upper and lower edges of the image (this data is referred to as "intermediate band data" below), such as band data 803 in FIG. 8, as well as margin data that has been appended to this band data. Specifically, margin data 302 and 303 has been appended to the left and right portions of the intermediate band data 301. When scanning in the sub-scan direction is carried out, scanning is performed, as indicated by arrow 304, from the upper left of the margin data 302 to the lower end thereof, scanning then transitions to the upper end of one column to the right and is then performed to the lower end of this column. Such scanning is repeated until the lower right of the margin data 302 is reached. Next, a transition is made to the upper left of the intermediate band data 301, scanning is performed, as indicated by arrow 305, to the lower end of the intermediate band data 301, scanning then transitions to the upper end of one column to the right and is then performed to the lower end of this column. Such scanning is repeated until the lower right of the intermediate band data 301 is reached. Finally, a transition is made to the upper left of the margin data 303, scanning is performed, as indicated by arrow 306, to the lower end of the margin data 303, scanning then transitions to the upper end of one column to the right and is then performed to the lower end of this column. Such scanning is repeated until the lower right of the margin data 303 is reached. This ends the scanning of the entirety of FIG. 3.

FIG. 4 illustrates band data 401 situated at a lower edge of the image (this data is referred to as "lower-edge band data" below), as well as margin data that has been appended to this band data. Specifically, margin data 402, 403 and 404 has been appended to the left, right and lower portions of the lower-edge band data 401. When scanning in the sub-scan direction is carried out, scanning is performed, as indicated by arrow 405, from the upper left of the margin data 402 to the lower end thereof, scanning then transitions to the upper end of one column to the right and is then performed to the lower end of this column. Such scanning is repeated until the lower right of the margin data 402 is reached. Next, a transition is made to the upper left of the lower-edge band data 401, scanning is performed, as indicated by arrow 406, to the lower end of the margin data 404, scanning then transitions to the upper end of one column to the right and is then performed to the lower end of this column. Such scanning is repeated until the lower right of the margin data 404 is reached. Finally, a transition is made to the upper left of the margin data 403, scanning is performed, as indicated by arrow 407, to the lower end of the margin data 403, scanning then transitions to the upper end of one column to the right and is then performed to the lower end of this column. Such scanning is repeated until the lower right of the margin data 403 is reached. This ends the scanning of the entirety of FIG. 4.

Figure 5:
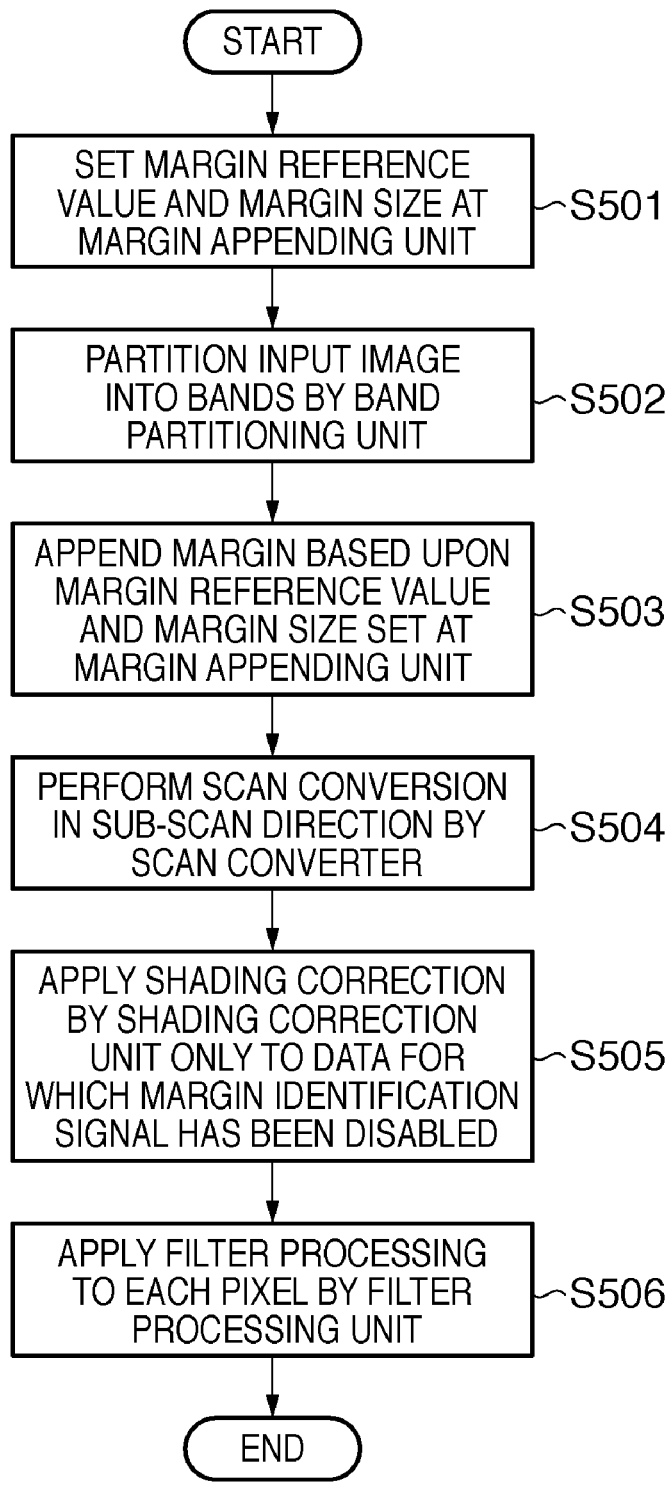
FIG. 5 is a flowchart illustrating the flow of processing executed by a scanner image processing apparatus according to an embodiment of the present invention.

Next, reference will be had to FIG. 5 to describe the flow of processing executed by the scanner image processing apparatus according to this embodiment. FIG. 5 is a flowchart illustrating the flow of processing executed by the scanner image processing apparatus according to this embodiment.

First, in step 501 in FIG. 5, the margin reference value 110 and margin size 111 used by the margin appending unit 102 are set as parameters. Processing then proceeds to step 502.

Next, in step 502, the band partitioning unit 101 partitions scan input image data into bands and delivers the resultant data to the margin appending unit 102, which is the next stage. Processing then proceeds to step 503.

Next, in step 503, margin data that is based upon the margin reference value 110 and margin size 111 set in step 501 is appended to the partitioned band data (partitioned image data) by the margin appending unit 102, and the result is delivered to the scan converter 103, which is the next stage. Processing then proceeds to step 504. At this time the margin identification number output unit 105 appends an enabled margin identification signal to the margin data and appends a disabled margin identification signal to the band data.

Next, in step 504, the scan converter 103 performs a scan conversion in the sub-scan direction and delivers the result to the shading correction unit 104, which is the next stage. Processing then proceeds to step 505.

Next, in step 505, the shading correction unit 104 senses the margin identification signal, applies an image correction (a shading correction) only to the band data, for which the margin identification signal has been disabled, and delivers the result to the filter processing unit 106 of the next stage. Processing then proceeds to step 506.

Next, in step 506, the filter processing unit 106 applies filter processing to each pixel. This ends the scanner image processing block.

Figure 6:
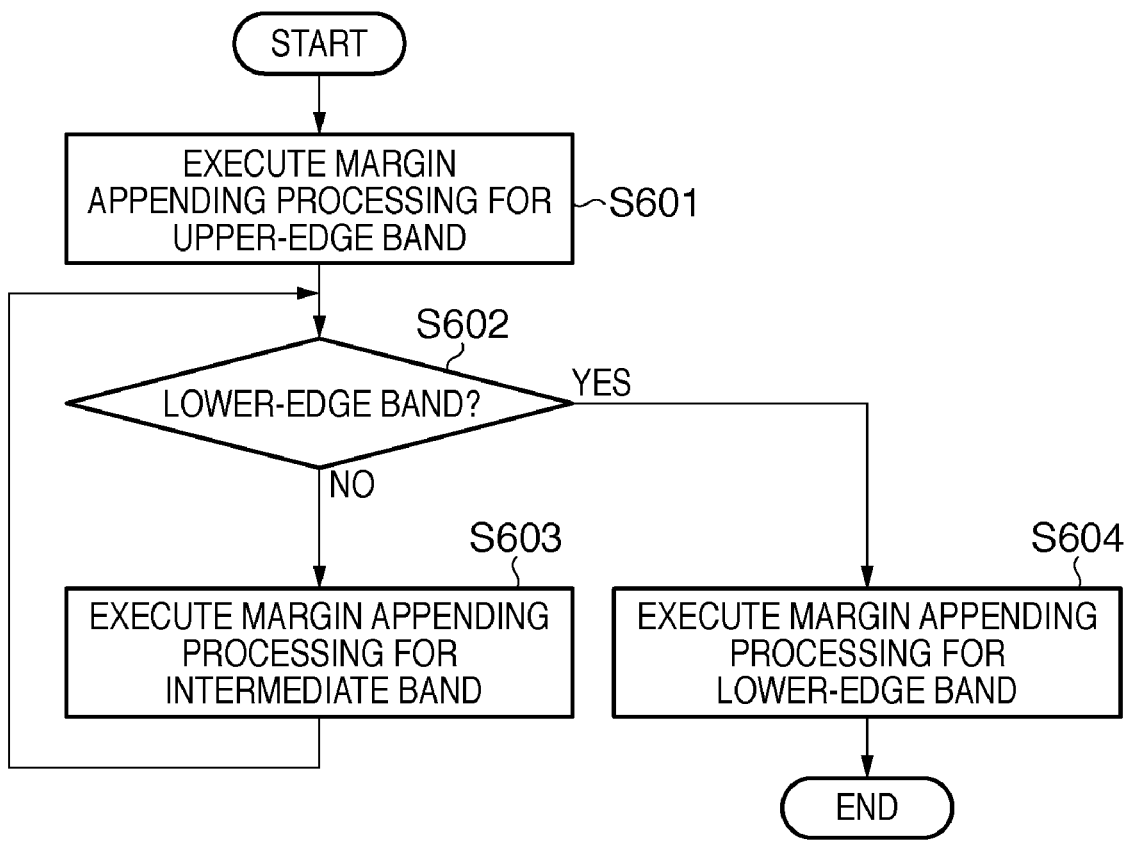
FIG. 6 is a flowchart illustrating the details of margin appending processing in step 503 in FIG. 5.

The processing of step 503 for appending a margin will now be described in detail. FIG. 6 is a flowchart illustrating the details of the margin appending processing in step 503 in FIG. 5.

First, in step 601, the band data to be input is the upper-edge band data 201. Accordingly, the margin appending unit 102 appends the margin data 202, 203 and 204 to the left, right and upper portions, respectively, of the upper-edge band data 201, delivers the result to the scan converter 103 and then inputs the next band data 301. Processing then proceeds to step 602. At this time the enabled margin identification signal is appended to the margin data 202, 203, 204, which has been appended to the left, right and upper portions, respectively, of the upper-edge band data 201, delivered to the scan converter 103, and the disabled margin identification signal is appended to the upper-edge band data 201.

Next, in step 602, the margin appending unit 102 determines whether the band data to be input is the lower-edge band data 401. If the result of the determination is that this is not the lower-edge band data 401, processing proceeds to step 603. On the other hand, if the data is the lower-edge band data 401, then processing proceeds to step 604.

In step 603, the band data to be input is the intermediate band data 301, namely data that is neither the upper-edge band data 201 nor the lower-edge band data 401, and therefore the margin appending unit 102 appends the margin data 302, 303 only to the left and right portions of the intermediate band data 301 and delivers the result to the scan converter 103. The margin appending unit 102 then inputs the next band data. Processing proceeds to step 602. At this time the enabled margin identification signal is appended to the margin data 302 and 303, which has been appended to the left and right portions, respectively, of the intermediate band data 301, delivered to the scan converter 103, and the disabled margin identification signal is appended to the intermediate band data 301.

In step 604, the band data is the lower-edge band data 401 and therefore the margin appending unit 102 appends the margin data 402, 403 and 404 to the left, right and lower portions, respectively, of the lower-edge band data 401 and delivers the result to the scan converter 103. Here processing by the margin appending unit 102 ends. At this time the enabled margin identification signal is appended to the margin data 402, 403, 404, which has been appended to the left, right and lower portions, respectively, of the lower-edge band data 401, delivered to the scan converter 103, and the disabled margin identification signal is appended to the margin data 404.

In the embodiment described above, it is possible to prevent shading correction processing of margin data, and this makes it possible to execute appropriate filter processing after the execution of shading correction processing. Further, it is possible to set any size of margin data appended and any reference value of margin data. As a result, optimum filter processing can be realized with little memory and it is possible to apply appropriate filter processing even to a special original such as film.

As many apparently widely different embodiments of the present invention can be made without departing from the spirit and scope thereof, it is to be understood that the invention is not limited to the specific embodiments thereof except as defined in the appended claims.

The means and steps constituting the embodiment of the present invention can be implemented by running a program that has been stored in a RAM or ROM, etc., of a computer. The program and a computer-readable recording medium on which the program has been recorded are covered by the present invention.

Further, the present invention is capable of being worked as, for example, a system, apparatus, method, program or recording medium and may be applied to an apparatus comprising a single device.

The present invention includes a case where it is attained also by supplying a software program, which implements the functions of the foregoing embodiment, directly or remotely to a system or apparatus, reading the supplied program with a computer of the system or apparatus, and then executing the program.

Accordingly, since the functional processing of the present invention is implemented by computer, the program codes per se installed in the computer also implement the present invention. In other words, the present invention also covers a computer program per se that is for the purpose of implementing the functional processing of the present invention. In this case, so long as the system or apparatus has the functions of the program, the form of the program, e.g., object code, a program executed by an interpreter or script data supplied to an operating system, etc., does not matter.

Further, the functions of the embodiment are implemented by having a computer execute a program that has been read. In addition, an operating system or the like running on the computer performs all or a part of the actual processing based upon the indications in the program. The functions of the foregoing embodiment can be implemented by this processing as well.

Furthermore, as an example of another method, first a program that has been read from a recording medium is written to a memory provided on a function expansion board inserted into the computer or provided in a function expansion unit connected to the computer. A CPU or the like provided on the function expansion board or function expansion unit performs some or all of the actual processing based upon the indications in the program, and the functions of the foregoing embodiment are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-203102, filed Aug. 3, 2007, which is hereby incorporated by reference herein in its entirety.

What is claimed is:

1. An image processing apparatus comprising:
a partitioning unit configured to partition entered image data into partitioned image data;
an appending unit configured to append additional data to the partitioned image data, append first identification information to the partitioned image data indicating that the partitioned image data is not margin data, and append second identification information to the additional data indicating that the additional data is margin data;
a correcting unit configured to receive the partitioned image data or the additional data, correct the partitioned image data based on the first identification information appended to the partitioned image data, and skip correcting the additional data based on the second identification information appended to the additional data; and
a processing unit configured to process the partitioned image data corrected by said correcting unit and the additional data.

2. The apparatus according to claim 1, wherein said correcting unit corrects the partitioned image data by a shading correction.

3. The apparatus according to claim 1, further comprising a converting unit configured to convert a scanning direction of the partitioned image data and the additional data,
wherein said correcting unit corrects the partitioned image data, the scanning direction of which has been converted by said converting unit.

4. The apparatus according to claim 1, wherein
said processing unit executes processing using a first pixel included in the partitioned image data and second pixels neighboring the first pixel, and
the additional data includes the second pixels not included in the partitioned image data.

5. The apparatus according to claim 1, further comprising a changing unit configured to change a value of the additional data to be appended by said appending unit.

6. The apparatus according to claim 1, further comprising a changing unit configured to change a size of the additional data appended by said appending unit.

7. An image processing method comprising:
a partitioning step of partitioning entered image data into partitioned image data;
an appending step of appending additional data to the partitioned image data, appending first identification information to the partitioned image data indicating that the partitioned image data is not margin data, and appending second identification information to the additional data indicating that the additional data is margin data;
a correcting step of receiving the partitioned image data or the additional data, correcting the partitioned image data based on the first identification information appended to the partitioned image data, and skipping correcting the additional data based on the second identification information appended to the additional data; and
a processing step of processing the partitioned image data corrected in said correcting step and the additional data.

8. The method according to claim 7, wherein said correcting step includes correcting the partitioned image data by a shading correction.

9. The method according to claim 7, further comprising
a converting step of converting a scanning direction of the partitioned image data and the additional data,
wherein said correcting step includes correcting the partitioned image data, the scanning direction of which has been converted in said converting step.

10. The method according to claim 7, wherein
said processing step includes executing processing using a first pixel included in the partitioned image data and second pixels neighboring the first pixel, and
the additional data includes the second pixels not included in the partitioned image data.

11. The method according to claim 7, further comprising a changing step of changing a value of the additional data to be appended in said appending step.

12. The method according to claim 7, further comprising a changing step of changing a size of the additional data appended in said appending step.

13. A non-transitory computer-readable storage medium storing a program for causing a computer to execute:
a partitioning step of partitioning entered image data into partitioned image data;
an appending step of appending additional data to the partitioned image data, appending first identification information to the partitioned image data indicating that the partitioned image data is not margin data, and a appending second identification information to the additional data indicating that the additional data is margin data;
a correcting step of receiving the partitioned image data or the additional data, correcting the partitioned image data based on the first identification information appended to the partitioned image data, and skipping correcting the additional data based on the second identification information appended to the additional data; and
a processing step of processing the partitioned image data corrected in the correcting step and the additional data.

14. The storage medium according to claim 13, wherein said correcting step includes correcting the partitioned image data by a shading correction.

15. The storage medium according to claim 13, further comprising
a converting step of converting a scanning direction of the partitioned image data and the additional data,
wherein said correcting step includes correcting the partitioned image data, the scanning direction of which has been converted in said converting step.

16. The storage medium according to claim 13, wherein
said processing step includes executing processing using a first pixel included in the partitioned image data and second pixels neighboring the first pixel, and
the additional data includes the second pixels not included in the partitioned image data.

* * * * *